United States Patent [19]

Frank et al.

[11] Patent Number: 5,285,496
[45] Date of Patent: Feb. 8, 1994

[54] METHODS AND APPARATUS FOR PROVIDING A SECURE PAGING SYSTEM

[75] Inventors: Edward H. Frank, Portola Valley; Donald C. Jackson, Monte Sereno, both of Calif.

[73] Assignee: FirstPerson, Inc., Mountain View, Calif.

[21] Appl. No.: 990,596

[22] Filed: Dec. 14, 1992

[51] Int. Cl.⁵ .............................................. H04K 1/02
[52] U.S. Cl. ........................................ 380/9; 380/49; 379/57; 340/825.44
[58] Field of Search ................... 380/9, 34, 48, 30; 379/57; 340/825.44, 825.47, 825.48

[56] References Cited

U.S. PATENT DOCUMENTS

| | | | |
|---|---|---|---|
| 4,803,726 | 2/1989 | Levine et al. | 380/48 |
| 4,882,579 | 11/1989 | Siwiak | 340/825.47 X |
| 5,018,196 | 5/1991 | Takaragi et al. | 380/30 |
| 5,072,444 | 12/1991 | Breeden et al. | 340/825.44 X |
| 5,103,459 | 4/1992 | Gilhousen et al. | 380/34 X |
| 5,168,271 | 12/1992 | Hoff | 340/825.44 |

FOREIGN PATENT DOCUMENTS

WO90/14735 11/1990 PCT Int'l Appl. ............ 340/825.44
WO91/17531 11/1991 PCT Int'l Appl. ............ 340/825.44

Primary Examiner—Tod R. Swann
Attorney, Agent, or Firm—Jeffrey J. Blatt

[57] ABSTRACT

A paging system which sends and receives encrypted messages. The message may be encrypted either by the sender of the message or by the paging system. Multiple keys may be used for encrypting and decrypting. Public key systems may also be used and integrated into this paging system. The paging system can send out time update messages containing the current time and date. The pagers use the time update messages to automatically update the time in an internal clock. Time stamps can be inserted into the encrypted messages to prevent unauthorized users from replaying old messages.

2 Claims, 4 Drawing Sheets

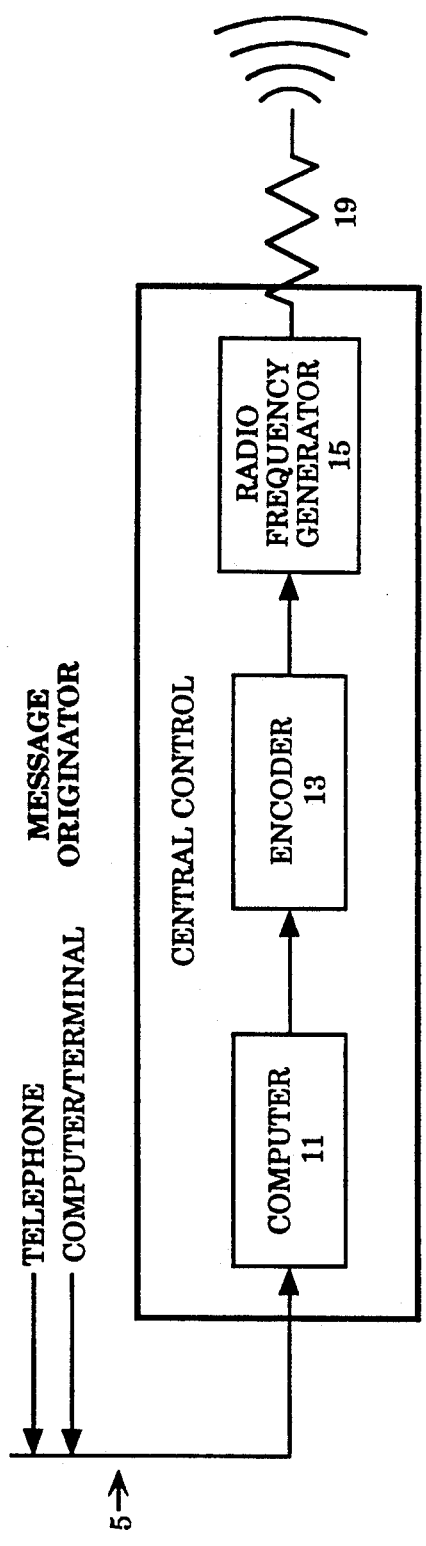
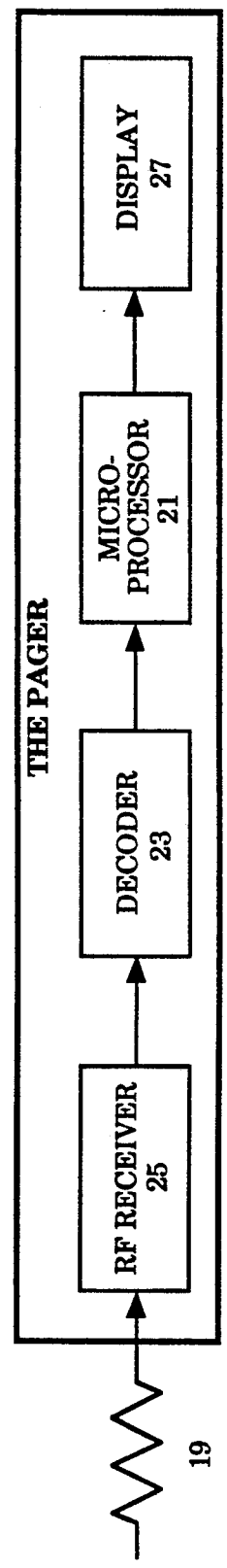
*Figure 1a* (Prior Art)
*Figure 1b* (Prior Art)

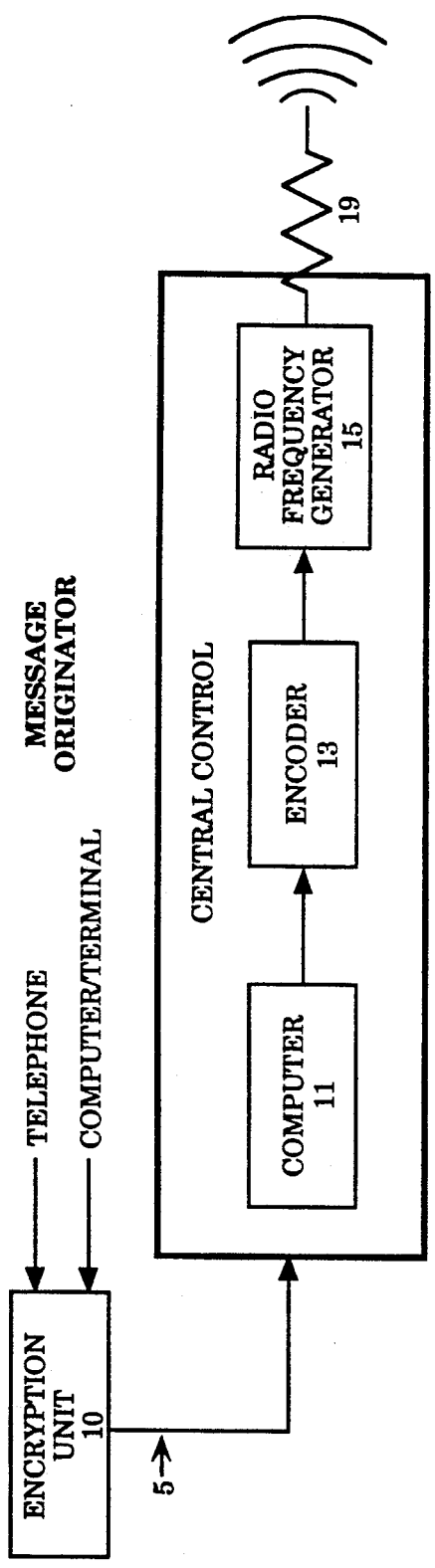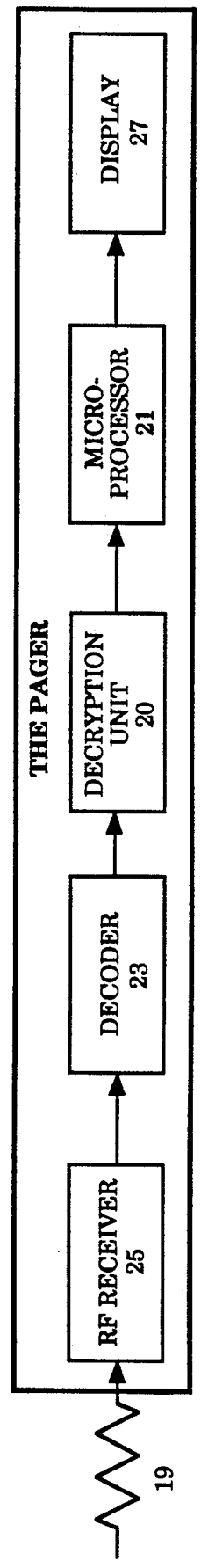
*Figure 3a*
*Figure 3b*

METHODS AND APPARATUS FOR PROVIDING A SECURE PAGING SYSTEM

BACKGROUND OF THE INVENTION

1. Field of the Invention

The present invention relates to electronic paging systems and pagers. More particularly, the present invention relates to methods and apparatus for providing a secure message paging system.

2. Art Background

Radio paging systems are widely utilized in today's mobile environment. Typically, a person carries a small radio receiving device, i.e. "the pager". A central control system activates the pager by transmitting a radio signal recognizable by the pager. Upon receipt of the radio signal, the pager notifies the user of the page by producing an audible sound, vibrating, or displaying a message.

As the popularity of pagers has increased so has the sophistication and functionality of pagers. There are three kinds of pagers commonly in use today: tone pagers, numeric pagers, and alphanumeric pagers. Tone pagers simply beep or vibrate upon receiving a page signal. The recipient of a page from a tone pager must know who sent the message in order to respond to the page. Numeric pagers receive a signal consisting of a string of digits, 0 through 9, and display the digits on a small display on the pager. The recipient of a page on a numeric pager responds to the page by telephoning the number that appears on the display screen. Alphanumeric pagers provide the most information to the page recipient. Alphanumeric pagers receive signals which contain an encoded string of letters and digits and display the string on a small display screen on the pager.

A person wishing to contact someone via a paging device contacts the central control system and requests that a signal be sent to a specific pager. For example, a person may dial a telephone number for the central control system and using the telephone keypad, enter in an identification number for the pager to be contacted. Alternately, a different telephone number may be assigned to each pager such that the telephone number dialed to contact the central control system identifies the pager to be contacted. The telephone keypad can be further utilized to key in a numeric string to be sent to the pager. In more sophisticated alphanumeric-type pager systems, a terminal device such as a workstation may be utilized to contact the central control system through a computer network to identify the pager to be contacted and to supply a message to be sent. Once the request is received by the central control system, the message is sent to the pager via radio broadcast.

Typically, a pager message consists of two parts: a pager address and a message body. The pager address identifies the which particular pager unit a message is directed to. The message body contains the string of letters and numbers which are to be displayed on the display screen.

However, due to the nature of radio broadcast, the transmission of a message to a pager is not secure. That is, unauthorized access to pager messages can occur since pager messages can be easily intercepted by anybody monitoring the radio broadcast frequency. Furthermore, certain information may be obtained just by being able to identify the recipient of the pager message. A pager message can be intercepted and responded to without the intended recipient's authorization. These security problems cause breaches in privacy and accuracy of the message. The unauthorized interception and reading of pager messages is even more an issue with alpha-numeric pagers, as the information that the sender intended for the receiver is contained within the message sent to the pager.

However, many encryption systems require specialized or substantial hardware and/or software to implement. In order to provide an effective, secure paging system, the security should be provided without changing the infrastructure of the available paging systems.

In addition, it is preferred that a secure paging system be implemented which does not require the message originator to have any knowledge of the security features of the pager system and therefore is transparent to the originator.

Most alphanumeric pagers currently being sold have an internal clock that must be set by hand, and that can be used to show the current time. One problem with these pagers is that it is difficult to keep the internal clock set properly. This is particular true for travelers who must change the internal clock when they travel between time zones. It would be convenient if the internal clock in the pager could set itself automatically.

SUMMARY OF THE INVENTION

The present invention provides a secure paging system wherein encrypted messages are transmitted to pagers equipped to decrypt such messages. Thus, this secure paging system prevents unauthorized interception of the messages. This secure paging system allows the intended recipient to be able to determine who sent the message such that there is no means for someone to forge the message, nor the sender's identity. A further aspect of this paging system is the option to make it impossible for an eavesdropper to know that a page has been sent to a particular recipient. This secure paging system is basically comprised of a message inputting means for inputting messages, an encryption unit for encrypting messages, a paging service for encoding and broadcasting the messages, and a pager for receiving, decoding and displaying the messages.

BRIEF DESCRIPTION OF THE DRAWINGS

The objects, features, and advantages of the present invention will be apparent to one skilled in the art in view of the following detailed description in which:

FIG. 1a is a block diagram illustration of a prior art radio paging transmitter system.

FIG. 1b is a block diagram illustration of a prior art radio paging receiver system.

FIG. 3a is a block diagram illustration of a secure radio paging transmitter system utilizing an encryption device at the source of the message.

FIG. 3b is a block diagram illustration of a secure radio paging receiver system utilizing a decryption device.

DETAILED DESCRIPTION OF THE INVENTION

Figure 2A:
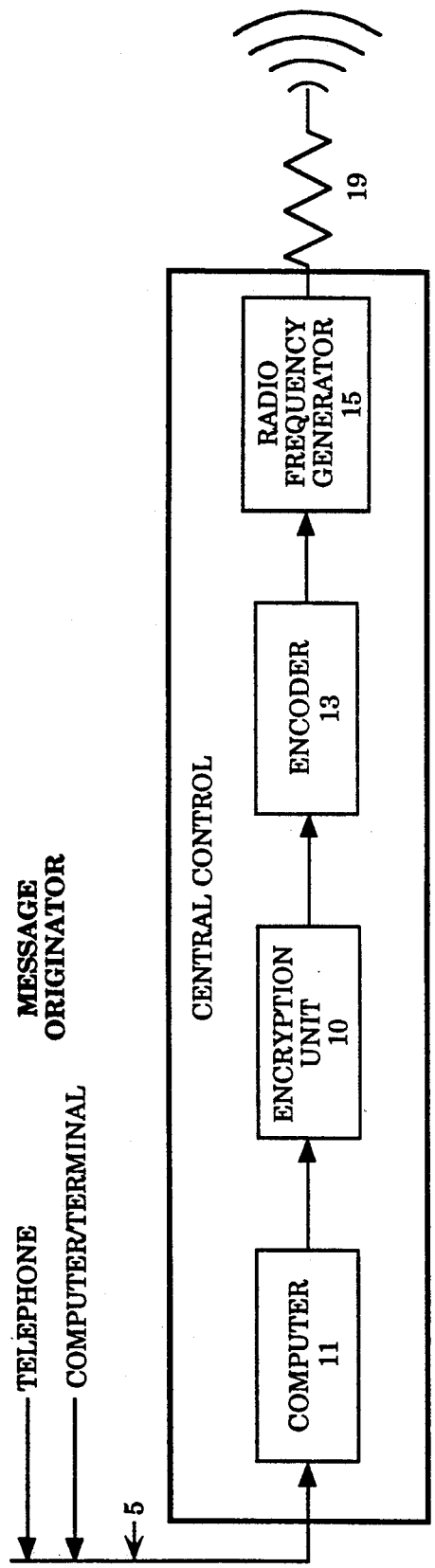
FIG. 2a is a block diagram illustration of a secure radio paging transmitter system utilizing an encryption device at the paging service central control.

A secure paging system utilizing encryption and decryption of pager messages is disclosed. In the following description, for purposes of explanation, specific configurations of the system are set forth in a preferred embodiment in order to provide a thorough understanding of the present invention. However, it will be apparent to one skilled in the art that the present invention may be practiced without the specific details of the preferred embodiment. In other instances, well known circuits and devices are shown in block diagram form in order not to obscure the present invention unnecessarily.

The Prior Art

Referring to FIGS. 1a and 1b, a typical prior art paging system is illustrated. Three parties are involved each time a typical paging system sends a message: the message originator, the pager service, and the page recipient. The message originator is a user wishing to communicate with a particular person ("the recipient") having a pager device ("the pager"). The message originator contacts the central control system of the pager service using a telephone or a computer terminal. The message originator transmits a non encrypted text message ("clear text") across communications lines 5 to a computer 11 at the central control system where it is processed. The computer 11 transmits the message to an encoder 13 which encodes the message for radio transmission. The encoder 13 passes the encoded message to a radio frequency generator 15 which broadcasts on a radio frequency 19.

Referring to FIG. 1b, a radio frequency ("RF") receiver 25 in the pager receives the radio frequency 19 which then is decoded by the decoder 23. The decoded signal is subsequently processed by a microprocessor 21 which looks for a message addressed for the pager. When a message directed for the pager is found, the pager displays the message on a display 27. The recipient of the page reads the message sent by the originator on the display 27.

Referring to FIG. 1a, it is apparent that any person with a radio receiver can monitor and intercept pager messages as they are broadcast on the radio frequency 19. A typical prior art pager system, therefore, is not secure and no confidential messages should be transmitted.

Data Encryption

Although there is no way to prevent the pager messages broadcast on the radio waves from being monitored by eavesdroppers, there is a method to prevent the eavesdroppers from understanding the messages. To protect pager message from eavesdroppers, the messages should be encrypted before transmission over the radio waves. The pager receiving an encrypted message decrypts the message using a specified decryption process.

The most appropriate type of encryption system for this application is a key encryption system. Key encryption systems combine the clear text with the encryption key using a an encryption algorithm to create an encrypted message. The encrypted message is decrypted using a decryption key and a decryption algorithm. Depending on the system, the encryption keys and decryption keys may or may not be the same. In its encrypted form, the data is indecipherable by one who does not have the decryption key. Thus, although an unauthorized access is not prevented, the message is unreadable. For further information on data encryption, see Dorothy Denning, *Cryptography & Data Security*, 1982, Addison Wesley Publishing Company, Reading Mass., and Carl Meyer and Stephen Matyas, *Cryptography: A New Dimension in Computer Data Security*, 1982, John Wiley & Sons, New York. Typically, two types of encryption systems are utilized: private key and public key systems.

Private key data encryption system consist of four entities: the plain text, i.e. the original message in plain language; a private encryption key which transforms the plain text into encrypted text; a private decryption key, which transforms the encrypted text into plain text; and the encrypted text, which is indecipherable without the private decryption key. The private encryption key and the private decryption key can be the same, or can be different. Multiple encryption key and decryption key pairs can be stored at the message originating and recipient devices. By using multiple keys in a private key system, a message recipient can distinguish between different message originators. For example, if a message can only be decrypted using decryption Key A, the message must have been sent by the message originator with encryption Key A; and if a message can only be decrypted using decryption Key B, the message must have been sent by the message originator with encryption Key B.

In a public-key encryption system each user has both a public key and private key. Any two users in a public-key encryption system can communicate with each other knowing only each other's public keys. In a public-key system, each user A has a public key with a corresponding public encrypting transformation $E_A$, which is known by all other users, and a private key with a corresponding private decrypting transformation $D_A$, which is known only to that user. The private transformation $D_A$ is described by the private key, and the public transformation $E_A$ is described by the public key which is derived from the private key using a one-way transformation. It must be impossible to determine the private key and private transformation $D_A$ from the public key or the public transformation $E_A$. To send a secret message using a public key system, a user encrypts the message using the recipients public key and then sends to the recipient who decrypts it using his private key.

For example, if user A wishes to send a message M to another user B and A knows B's public key, user A can send the message M to user B in secrecy by sending the encrypted text $C=E_B(M)$. On receipt, user B decrypts the encrypted text C using B's private transformation $D_B$ to get the message M using $D_B(C)=D_B(E_B(M))=M$.

Public key systems can also be used to authenticate messages. To send a message from user A to user B which user B can authenticate, the message M must be transformed by user A's own private transformation $D_A$. For example, A sends an encrypted text C encrypted by his private transformation $C=D_A(M)$ to user B. When user B receives the encrypted text C, user B uses user A's public transformation $E_A$ to obtain the message M using $M=E_A(C)=E_A(D_A(M))$. The message has been authenticated since only user A can apply the transformation $D_A$. However, no secrecy is provided because any user with access to user A's public transformation $E_A$ can recover message M.

To achieve both secrecy and authenticity, the sender and receiver must each apply two sets of transformations. For example, if user A wishes to send a secret message M to user B in manner such that user B can authenticate that the message M was sent by user A, the following steps are performed. First user A's private transformation $D_A$ is applied. Then user A encrypts the result using user B's public encrypting transformation $E_B$, and transmits the doubly transformed message $C=E_B(D_A(M))$ to user B. User B recovers message M by first applying user B's own private decrypting transformation $D_B$, and then applying user A's public transformation $E_A$ to validate its authenticity. Thus the message M is decrypted from the encrypted text C using $M=E_A(D_B(C))$.

The private key and public key encryption methods described above can be used to encrypt and decrypt the body of pager messages. Encrypting the message body alone prevents unauthorized recipients from reading the message since only the correct decryption key will allow the message body to be read. However, in certain situations, this may not provide enough security. For example, if the only the body of a pager message is encrypted, an eavesdropper might obtain useful information by examining the address fields of the pager messages.

For example, a party involved in sensitive political or business negotiations may wish to prevent the opposing party from knowing that he is receiving any outside information. If the pager address for each message is encrypted along with the message body, then even if the opposing party knows pager address of the first party they cannot detect if the first party is receiving any pager messages.

Furthermore, in a system that does not encrypt the address field of the messages, an eavesdropper need only watch for the (unencrypted) address to capture the messages he is interested in. The eavesdropper can then devote all his resources to decrypting those messages. However, if the system encrypts the address field for every message, it becomes far more difficult for an eavesdropper to intercept messages destined for one particular person. For example, consider a paging system which handles thousands of messages a day and only one of the messages is destined for a particular pager. If the system encrypts the address field the address field for every message, then the eavesdropper is forced to decrypt every message looking for the one he wants. Therefore a system with encrypted addresses is, in general, much more secure than a system that only encrypts the body of a message.

An eavesdropper that cannot break the encryption system could attempt to trick a message recipient by recording a broadcasted message, and then replaying the encrypted message at a later time. For example, an eavesdropper could record the encrypted "buy" and "sell" messages sent to a stock broker. If the messages were sent again later by the eavesdropper, the messages could fool the broker into performing transactions that should not have taken place. To prevent this from occurring, a time stamp should be encrypted along with the message. By encrypting a time stamp with each message, the microprocessor in the pager unit can examine the time stamp to see if it is recent. If the time stamp is more than a few seconds old, then the pager would assume that the message was a hoax and throw it out.

Prior art pager systems can be modified to broadcast encrypted messages in two ways: an encryption unit can be placed in the central control system of the pager service or an encryption unit can be placed at the message source. Each method of adding message encryption has advantages and disadvantages.

Encryption at the Central Control System

Figure 2B:
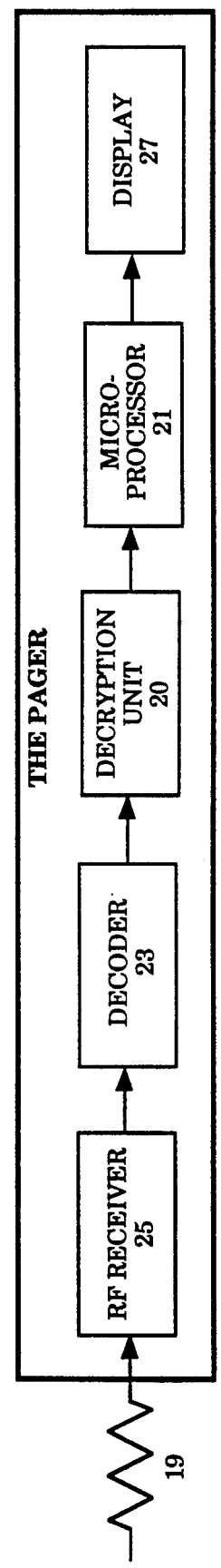
FIG. 2b is a block diagram illustration of a secure radio paging receiver system utilizing a decryption device.

FIGS. 2a and 2b illustrates an embodiment of the present invention where the encryption is done at the central control system of the pager service. The message originator contacts the central control system of the pager service using a telephone or a computer terminal. Referring to FIGS. 2a, the message originator transmits a clear text message across communications lines 5 to a computer 11 at the central control system where it is processed. The computer 11 transmits the message to an encryption unit 10 which encrypts the message. The encryption unit 10 may simply be a program in the computer 11. The encryption unit 10 transmits the encrypted message along to an encoder 13 which encodes the encrypted message for radio transmission. The encoder 13 passes the encoded message to a radio frequency generator 15 which finally broadcasts on a radio frequency 19.

To receive the encrypted message on a pager, the steps are reversed. Referring to FIG. 2b, a radio frequency ("RF") receiver 25 in the pager receives the radio frequency 19 passes it to the decoder 23. The decoder 23 decodes the message and passes it to the decryption unit 20. The decryption unit 20 decrypts the message and passes it to the microprocessor 21. The microprocessor 21 examines the address field of the message and compares it to the address of the pager unit. If the address in the address field matches the address of the pager unit, the pager displays the message on the display 27. The recipient of the page reads the message sent by the originator on the display 27.

By placing the encryption unit in the central control system of the pager service, as illustrated in FIG. 2a, the encryption means is transparent to the message originator and the message recipient. That is, security is added to the system without requiring special knowledge by the message originator or the message recipient. When the encryption is executed by the paging service, it is easy to encrypt both the address field and the message body.

The encryption system disclosed in FIGS. 2a and 2b suffers from one significant drawback, the communication lines 5 are not secure. Referring to FIG. 2a, it is apparent that a determined eavesdropper can tap into the communication lines 5 between the message originator and the computer 11 at the central control system and intercept messages before the messages are encrypted. Furthermore, the message arrives at the central control system in clear text form so employees at the pager service can read the messages. It is therefore desirable to place an encryption unit closer to the message source.

Encryption at the Source

FIGS. 3a and 3b illustrates an embodiment of the present invention where the message encryption is performed very close to the source of the message. Referring to FIG. 3a, the message originator contacts an encryption unit 10 using a telephone or a computer. The message originator inputs a clear text message into the encryption unit 10. The encryption unit 10 encrypts the clear text message to produce an encrypted message. Depending upon the method that the pager service uses to obtain the pager address from the message originator, the message address may or may not be encrypted along with the message body. The encrypted message is sent across the communications lines 5 to the computer 11 at the central control system where the message is processed. If message does not have an address yet, the computer 11 adds an address to the encrypted message and transmits the combined message to the encoder 13. The encoder 13 encodes the combined message for radio transmission and passes an encoded message to a radio frequency generator 15. The radio frequency generator 15 finally broadcasts the message on a radio frequency 19.

Referring to FIG. 3b, a radio frequency ("RF") receiver 25 in the pager receives the radio frequency 19 passes it to the decoder 23. The decoder 23 decodes the message and passes it to the decryption unit 20. The decoded signal is subsequently processed by a microprocessor 21 which looks for a message addressed for the pager. When the message is addressed to this particular pager, the pager displays the message on the display 27. The recipient of the page reads the message sent by the originator on the display 27.

The most significant advantage of encrypting messages at the source is that the messages are protected from eavesdroppers at every step from the message originator to the message recipient. For example, even if an eavesdropper taps into the communication lines 5 between the message originator and the pager central control system, or employs a spy at the pager central control system, the eavesdropper would not be able to read the messages. Therefore, encryption at the source gives a higher degree of security than encryption by the pager central control system.

Additionally, encrypting messages at the source can be done without changing the current paging service infrastructure, thus minimizing costs. The message originators are simply given computer software to install on their personal computers or workstations, and the message recipients are given new pagers with the decryption unit installed. The transition can be done incrementally since the old pager units would simply ignore the encrypted messages and throw the messages out.

One problem with the encryption at the source system is that the central control system at the pager service loses much of its control. For example, when the encryption unit at the source encrypts both the address field and the message body, then the central control system has no control over the contents of the messages it receives. A malicious person could send a flood of nonsense messages to the central control system. Since the central control system would have no method of determining if the messages were real or not, the central control system must broadcast the message as is. However, this problem can be alleviated by requiring additional authentication by a user to the server. Alternatively, the system may be provided with a limitation as to the number of messages which may be received over any given time period.

Time Update and Calendar

Pagers often have internal clocks which are used to display the current time and date. The internal clock must be set manually by the owner of the pager using buttons on the outside of the pager. To improve the pager, an automatic time update feature should be implemented.

Figure 4:
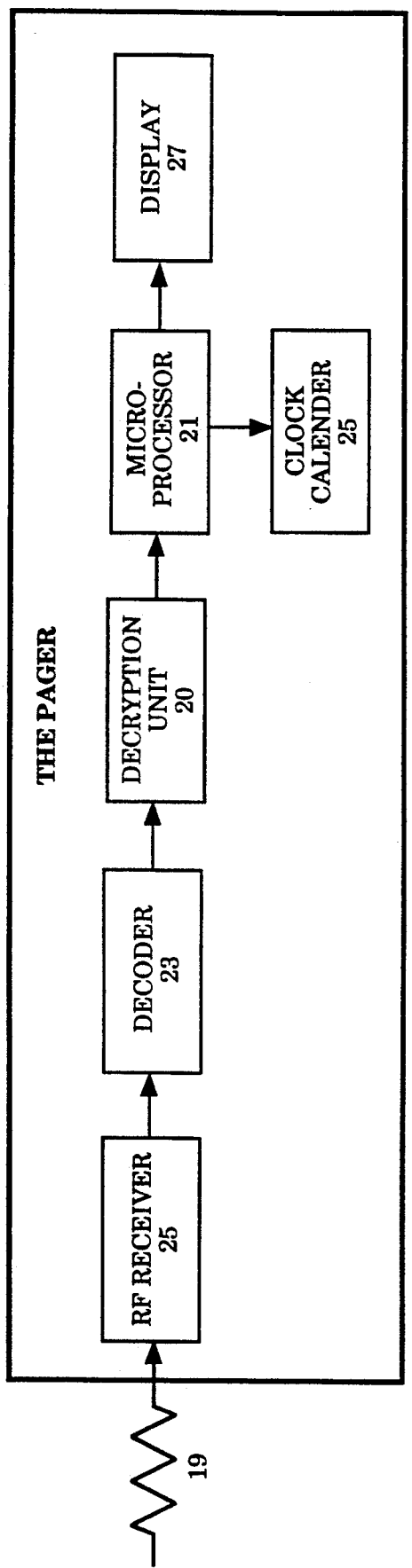
FIG. 4 is a block diagram illustration of the paging system of the present invention with an automatic time setting feature.

Referring to FIG. 4, a block diagram of a pager which contains an automatic time update feature is illustrated. To implement the time and date updating feature, the pager central control system must send out a message with a universal clock update address field and a message body containing the current time and date at regular intervals. The universal clock update address field signifies that the associated message body contains the current time and date. When each pager receives a message containing the universal clock update address field, the microprocessor 21 reads the current time and date in the message body and sends the time and date in the internal clock 25. Each pager has a means to disable automatic time updating feature if the operator so desires.

The automatic time updating feature would allow users who travel to different time zones to automatically have their pager clocks set to the current time zone time. If the pager unit is not receiving the time update messages, it could display this fact on the display screen and request the user to set the time manually. The fact that the pager is not receiving time update messages might indicate that the pager has been taken out of the radio transmitter's range.

In some cases, individuals like to have their timepiece display a time that is a little bit ahead or behind the actual time. For example, some people like to set their watch 5 minutes fast to avoid missing appointments. In a paging system with the automatic time updating, this function is easily accommodated by having a separate "time offset" function. The time offset would initially have a default value of zero. Those users that would like to adjust the value would set the time offset value in the same manner that a normal clock would be set. However, rather than being incremented like a clock, the time offset value would instead by added to or subtracted from the actual time as it is displayed to the user.

Internal alarm memories can be added a pager unit that has an internal clock. The internal alarm memories provide the user with alarm clock functions. To set the internal alarm memories, the central control system sends out personal alarm messages to the pagers. For example, a computer based calendar system could automatically send special messages which contain a users daily schedule to the central control system. The central control system would broadcast the message containing the daily schedule. The microprocessor 21 in the pager would read the schedule message and set the alarm memories accordingly. The pager could also store a text message along with each alarm. In this manner the computer based calendar could send a message to set the pagers alarm clocks and the associated message strings each morning. The user, upon receiving this "set alarm clock message" could review the calendar appointments for the day, and delete any that were no longer relevant.

Accordingly, apparatus and methods for implementing a secure paging device have been disclosed. Although the present invention has been described with reference to FIGS. 1a, 1b, 2a, 2b, 3a, 3b, and 4 it will be apparent to one skilled in the art that the present invention has utility far exceeding that disclosed in the figures. It is contemplated that many changes and modifications may be made, by one of ordinary skill in the art, without departing from the spirit and scope of the invention as disclosed herein.

What is claimed is:

1. A secured paging system, said secure paging system comprising the elements of:

message input means for inputting a message, said message comprising an address field and a message body, said address field specifying a particular pager;

encryption means, said encryption means receiving said message from said message input means, said encryption means encrypting said message to produce an encrypted message;

transmitting means, said transmitting means coupled to said encryption means for receiving said encrypted message and broadcasting said encrypted message on a radio frequency to a plurality of radio receivers, said transmitting means having a computer for processing said encrypted message to generate a processed message, an encoder for encoding said processed message to generate an encoded message, and a radio frequency generator coupled to said encoder for broadcasting said encoded message on said radio frequency; and a pager for receiving said encrypted message broadcast on said radio frequency, said pager having a pager address, said pager decrypting said encrypted message to obtain said address field and said message body, said pager comparing said address field with said pager address, said pager displaying said message body if said address field matches said pager address.

2. The secure paging system as claimed in claim 1, wherein said pager comprises:

a radio frequency receiver, said radio frequency receiver tuned to receive said radio frequency such that said radio frequency receiver receives said encoded message;

a decoder, said decoder coupled to said radio frequency receiver to receive said encoded message, said decoder decoding said encoded message into said encrypted message;

a decryption unit, said decryption unit coupled to said decoder, said decryption unit said decrypting said encrypted message into said message comprising said address field and said message body;

comparison means, said comparison means comparing said address field with a pager address; and a display, said display displaying said message when said address field and said pager address match.

* * * * *